United States Patent
Yang et al.

(10) Patent No.: US 7,792,233 B2
(45) Date of Patent: Sep. 7, 2010

(54) PACKET PREAMBLE SEARCH METHOD AND DEVICE THEREOF

(75) Inventors: Jia-Yu Yang, Taichung (TW); Wen-Jan Lee, Hsinchu (TW); Kwo-Wei Chang, Hsinchu County (TW)

(73) Assignee: Princeton Technology Corporation, Taipei (TW)

( * ) Notice: Subject to any disclaimer, the term of this patent is extended or adjusted under 35 U.S.C. 154(b) by 1039 days.

(21) Appl. No.: 11/478,767

(22) Filed: Jul. 3, 2006

(65) Prior Publication Data

US 2007/0160174 A1      Jul. 12, 2007

(30) Foreign Application Priority Data

Jan. 6, 2006    (TW) .............................. 95100573 A

(51) Int. Cl.
*H04L 7/00*     (2006.01)

(52) U.S. Cl. ................... 375/365; 375/354; 375/368; 370/304; 370/324; 370/350; 370/395.62; 370/503; 370/507; 370/509; 370/510; 370/511; 370/512; 370/513; 370/514; 370/520

(58) Field of Classification Search ............... 375/354, 375/364, 365, 368; 370/324, 350, 509, 514, 370/304, 395.62, 503, 507, 510, 511, 512, 370/513, 520

See application file for complete search history.

(56) References Cited

U.S. PATENT DOCUMENTS

| 4,837,854 | A | * | 6/1989 | Oyagi et al. | ................ 340/7.33 |
| 5,122,778 | A | * | 6/1992 | Erhart et al. | .............. 340/146.2 |
| 5,748,688 | A | * | 5/1998 | Kim et al. | .................... 375/368 |
| 2004/0107391 | A1 | * | 6/2004 | Bauman | ..................... 714/704 |

* cited by examiner

*Primary Examiner*—Mohammad H Ghayour
*Assistant Examiner*—Leila Malek
(74) *Attorney, Agent, or Firm*—Muncy, Geissler, Olds, & Lowe, PLLC

(57) ABSTRACT

A packet preamble search method is disclosed for locating a packet preamble with multiple predetermined patterns of a regular form within a received transmission signal with sequential multiple patterns. The pattern of the received transmission signal and the predetermined pattern of the packet preamble have the same length with even bits. The pattern of the transmission signal is sequentially compared with the predetermined pattern. A hit count is increased and a miss count is reset when the pattern of the transmission signal matches the predetermined pattern. The miss count is increased and the hit count is decreased when the pattern of the transmission signal does not match the predetermined pattern. The hit count and the miss count are reset when the hit count is less than or equal to the miss count. An address matching procedure is activated when the hit count exceeds or is equal to a threshold value.

6 Claims, 4 Drawing Sheets

PACKET PREAMBLE SEARCH METHOD AND DEVICE THEREOF

BACKGROUND OF THE INVENTION

1. Field of the Invention

The invention relates to a search method and a device thereof, and in particular relates to a packet preamble search method and a device thereof.

2. Description of the Related Art

In a communication system, a transmitted signal includes a desired transmitted payload, a destination address, and other extensions for specific purposes. For example, a transmitted signal may include an error detection/correction code (e.g., Cyclic Redundancy Check (CRC)) and a packet preamble for synchronization. The above-mentioned items are assembled into a single packet as shown in FIG. 1 before transmission. A format of the packet is illustrated in FIG. 1, wherein the packet comprises the packet preamble 11, the destination address 12, the payload 13, and the Cyclic Redundancy Check (CRC) 14. The packet is prefaced by the packet preamble to ensure that a starting point of the packet can be located and further to make the subsequent received signal understood by a receiver of the communication system. The packet preamble can be easily recognized by the receiver of the communication system as the packet preamble is coded with regular form. If the packet is transmitted directly without being prefaced by the packet preamble, noise intervening between the transmitted signal may coincide with the destination address. Thus the coincidence between the corrupted transmitted signal and the destination address will cause a false alarm. The probability of false alarms can be significantly reduced by prefacing the packet with the packet preamble, since false alarms will only happen when the corrupted transmitted signal matches the packet preamble and the destination address simultaneously. Accordingly, the packet preamble search becomes the most important topic during the process of disassembling the packet.

In the prior art, the signal of the same bit length as that of the packet preamble will be extracted from the received transmission signal for a complete bitwise pattern match, since searching the entire packet preamble by the receiver of the communication system is required to proceed with the subsequent disassembly work for the other components of the packet such as the destination address and the error detection/correction code. If the extracted signal matches the packet preamble exactly, the subsequent disassembly work for the other components of the packet will be processed. If any one bit of the extracted signal does not match that of the packet preamble, another series of signal of the same bit length with that of the packet preamble will be extracted from the received transmission signal for the pattern matching until the signal extracted from the received transmission signal matches the packet preamble. However, the transmitted signal will be interfered with by the noise when transmitted in a bad condition that makes the received transmission signal undesirable. The complete bitwise pattern match required by the conventional packet preamble search method is time consuming as the entire packet preamble must be searched, thus delaying the communication time and reducing the efficiency.

BRIEF SUMMARY OF THE INVENTION

In view of the foregoing, this present invention provides a packet preamble search method in a communication system for locating a packet preamble with multiple predetermined patterns of a predetermined regular form of a packet within a received transmission signal with sequential multiple patterns. The pattern of the received transmission signal and the predetermined pattern of the packet preamble have the same predetermined length with even bits. The pattern of the transmission signal is sequentially compared with the predetermined pattern. A hit count is increased and a miss count is reset when the pattern of the transmission signal matches the predetermined pattern. The miss count is increased and the hit count is decreased when the pattern of the transmission signal does not match the predetermined pattern. The hit count and the miss count are reset when the hit count is less than or equal to the miss count. An address matching procedure is activated when the hit count is greater than or equal to a predetermined threshold value.

In addition, this present invention provides a packet preamble search device in the communication system for locating the packet preamble of a packet with multiple predetermined patterns of the predetermined regular form within the received transmission signal with sequential multiple patterns. The pattern of the received transmission signal and the predetermined pattern of the packet preamble have the same predetermined length with even bits. The packet preamble search device comprises a first register, a second register, a third register, a first counter, a second counter, a comparator, and a control unit. The first register functions as storing the pattern of the received transmission signal. The second register functions as storing the predetermined pattern. The third register functions as storing a predetermined threshold value. The first counter functions as storing the hit count, increasing the hit count according to a hit signal, decreasing the hit count according to a miss signal, and resetting the hit count according to a first reset signal. The second counter functions as storing the miss count, increasing the miss count according to the miss signal, and resetting the miss count according to the second reset signal. The comparator compares the pattern of the transmission signal with the predetermined pattern, compares the hit count with the predetermined threshold value, and compares the hit count with the miss count. The control unit, according to a comparison result of the comparator, provides the hit signal and the second reset signal when the pattern of the transmission signal matches the predetermined pattern, provides an address check signal when the hit count is greater than or equal to the predetermined threshold value, provides the miss signal when the pattern of the transmission signal does not match the predetermined pattern, and provides the first reset signal and the second reset signal when the hit count is less than or equal to the miss count.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
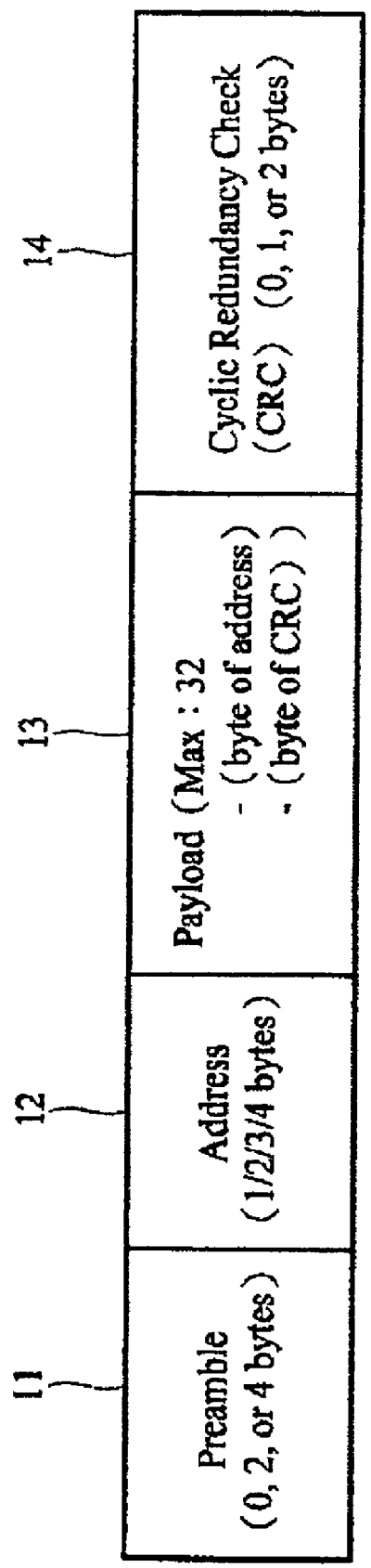
FIG. 1 illustrates a format of a packet.
Figure 2:
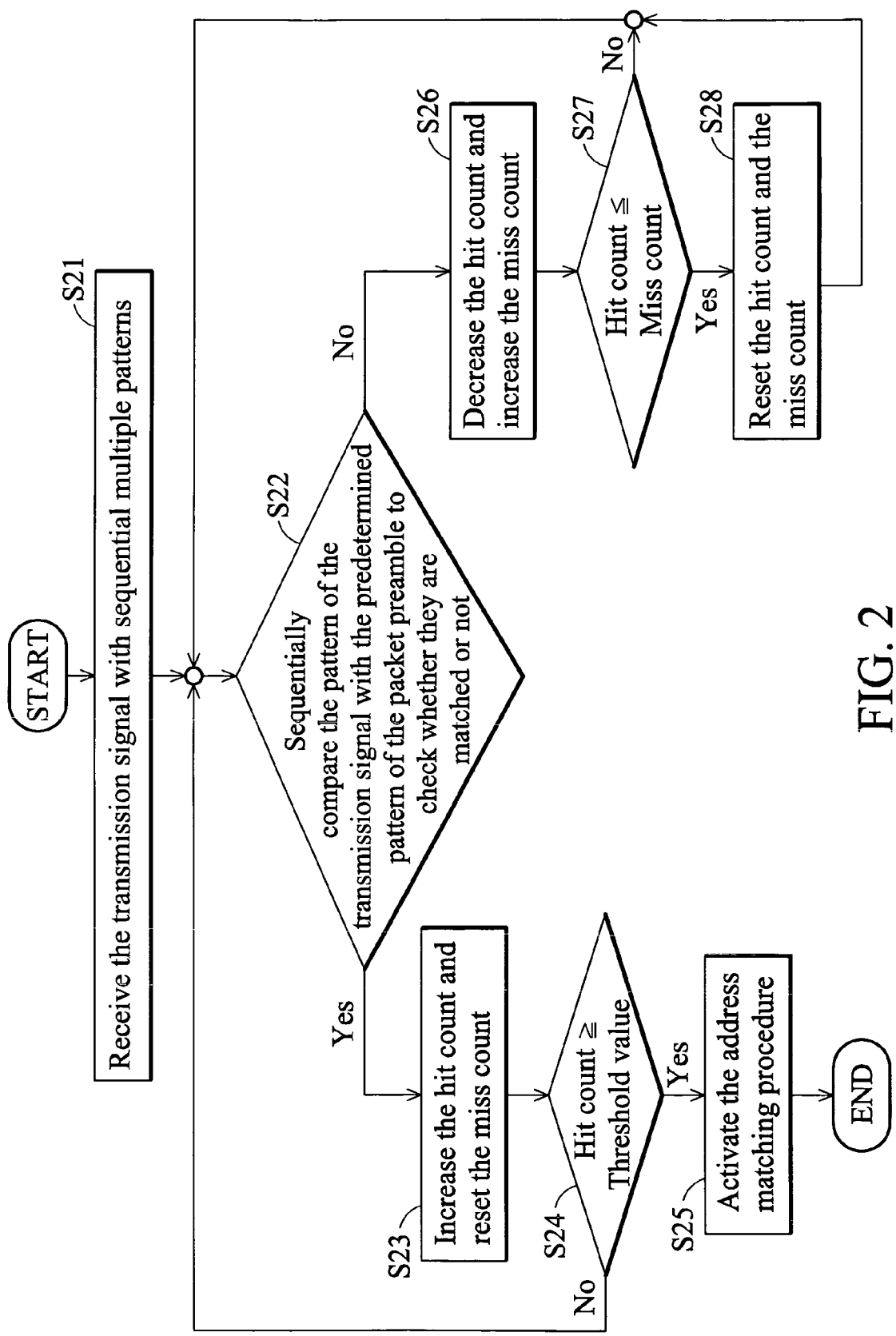
FIG. 2 illustrates a flowchart of a packet preamble search method operations in accordance with an embodiment of the present invention.

FIG. 2 illustrates a flowchart of a packet preamble search method operations in accordance with an embodiment of the present invention. As shown in FIG. 2, at first, a transmission signal with sequential multiple patterns is received (S21) in a communication system, wherein the sequential multiple patterns are a series of signals composed of "0" and "1". The pattern of the transmission signal is then sequentially compared with the predetermined pattern of a predetermined regular form of the packet preamble to check whether they are matched or not (S22). It is said "matched" when the pattern of the transmission signal and the predetermined pattern of the packet preamble are exactly the same bitwise. The packet preamble is determined by the following rules. The predetermined pattern of the predetermined regular form of the packet preamble is "010101 . . . 01", represented by $(01)^n$, wherein the "n" is a natural number, if the most significant bit (MSB) of the destination address 12 (refer to FIG. 1) of the transmitted packet is 0. The predetermined pattern of the predetermined regular form of the packet preamble is "101010 . . . 10", represented by $(10)^n$, wherein the "n" is a natural number, if the most significant bit (MSB) of the destination address 12 (refer to FIG. 1) of the transmitted packet is 1. Undoubtedly, each pattern extracted from the received transmission signal and the predetermined pattern of the packet preamble have the same predetermined length with even bits. Take the predetermined bit length is 2 as an example. If the received transmission signal is "0111000101100110", it means the received transmission signal have sequential patterns 01, 11, 00, 01, 01, 10, 01, and 10. Additionally, the most significant bit (MSB) of the destination address 12 (refer to FIG. 1) of the transmitted packet is 0, and the predetermined pattern of the predetermined regular form of the packet preamble is $(01)^n$, wherein the "n" is 1, i.e., the predetermined pattern of the predetermined regular form of the packet preamble is "01". During the process of the pattern of the transmission signal sequentially compared with the predetermined pattern of the predetermined regular form of the packet preamble to check whether they are matched or not, the operation flow complies with the following. When the pattern of the received transmission signal matches the predetermined pattern of the packet preamble, a hit count will be increased and a miss count will be reset (S23). Then check whether the hit count is greater than or equal to a predetermined threshold value or not (S24). An address matching procedure is activated when the hit count is greater than or equal to the predetermined threshold value (S25). The process of sequentially comparing the pattern of the transmission signal with the predetermined pattern of the predetermined regular form of the packet preamble to determine if they match or not (S22) continues until the hit count is greater than or equal to the predetermined threshold value. Otherwise, when the pattern of the received transmission signal does not match the predetermined pattern of the packet preamble, the miss count will be increased and the hit count will be decreased (S26). It is then determined whether the hit count is less than or equal to a predetermined threshold value (S27). The hit count and the miss count are reset when the hit count is less than or equal to the miss count (S28). The process of sequentially comparing the pattern of the transmission signal with the predetermined pattern of the predetermined regular form of the packet preamble to determine if they are matched or not (S22) continues when the hit count is greater than the miss count or the hit count and the miss count are reset simultaneously.

Figure 3:
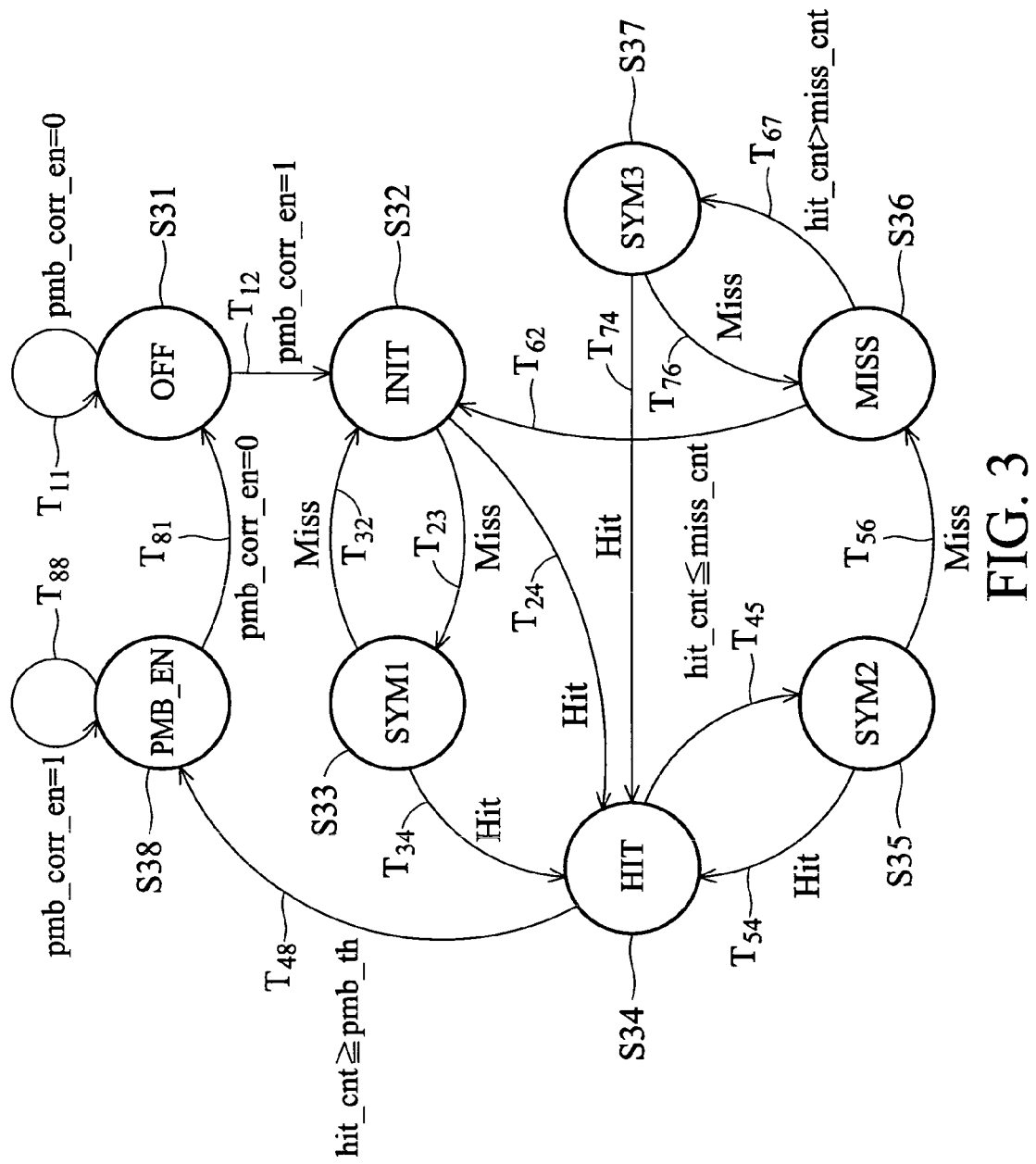
FIG. 3 illustrates a state diagram of the packet preamble search method in accordance with the embodiment of the present invention.

FIG. 3 illustrates a state diagram of the packet preamble search method in accordance with an embodiment of the invention, wherein the predetermined bit length of each pattern of the transmission signal and that of the predetermined pattern of the predetermined regular form of the packet preamble are 2. As shown in FIG. 3, there are eight states, including: off state OFF (S31), initial state INIT (S32), first transient state SYM1 (S33), hit state HIT (S34), second transient state SYM2 (S35), miss state MISS (S36), third transient state SYM3 (S37), and preamble search finish state PMB_EN (S38). The transitions among the states are controlled by parameters hit_cnt, miss_cnt, and pmb_th. The parameter hit_cnt used for recording the hit count will be modified as described in the following. When the pattern of the received transmission signal matches the predetermined pattern of the packet preamble (i.e., hit), the parameter hit_cnt is increased. When the pattern of the received transmission signal does not match the predetermined pattern of the packet preamble (i.e., miss), the parameter hit_cnt will be decreased. When the parameter hit_cnt is less than or equal to the parameter miss_cnt, the parameter hit_cnt will be reset (the parameter miss_cnt will also be reset). The parameter miss_cnt used for recording the miss count will be modified as described in the following. When the pattern of the received transmission signal does not match the predetermined pattern of the packet preamble (i.e., miss), the parameter miss_cnt will be increased. When the pattern of the received transmission signal matches the predetermined pattern of the packet preamble (i.e., hit) or when the parameter hit_cnt is less than or equal to the parameter miss_cnt, the parameter miss_cnt will be reset under the both conditions. Additionally, when the parameter hit_cnt is less than or equal to the parameter miss_cnt, not only will the parameter miss_cnt be reset but the parameter hit_cnt will also be reset as previously described. The parameter pmb_th is used for recording the predetermined threshold value set by the search system. When the parameter hit_cnt is greater than or equal to the parameter pmb_th, the packet preamble search is complete. The state transitions are affected by the three parameters hit_cnt, miss_cnt, and pmb_th. The state machine will change once according to the condition when the search system is fed a bit. As the off state, the state OFF (S31) does not transit to the state INIT (S32), until the parameter pmb_corr_en is 1 (i.e., a packet preamble search command is issued by the search system). As the initial state, the state INIT (S32) in which the whole system will be initialized transits to the state HIT (S34) when the pattern of the received transmission signal matches the predetermined pattern of the packet preamble (i.e., hit). Otherwise, the state INIT (S32) will transit to the state SYM1 (S33) when the pattern of the received transmission signal does not match the predetermined pattern of the packet preamble (i.e., miss). The search system will recover back to the initial state INIT (S32) and reissue the packet preamble search command when some problem happens or there is no packet preamble recognized for a long time. The state SYM1 (S33) is a transient state. Either the state SYM1 (S33) or the state INIT (S32) will transit to state HIT (S34) once the pattern of the received transmission signal matches the predetermined pattern of the packet preamble (i.e., hit). If the subsequent patterns of the received transmission signal all match the predetermined pattern of the packet preamble (i.e., hit), the transitions between the state SYM2 (S35) and the state HIT (S34) will continue until the parameter hit_cnt is greater than or equal to the parameter pmb_th, and then the state HIT (S34) will transit to the state PMB_EN (S38). In state PMB_EN (S38), the packet preamble search is finished and parameter addr_corr_en is set to 1 (i.e., the address matching procedure will be activated). In state SYM2 (S35), if the pattern of the received transmission signal does not match the predetermined pattern of the packet preamble (i.e., miss), the search system will change to state MISS (S36). At this moment, if parameter hit_cnt is still greater than the parameter miss_cnt, the search system will change to state SYM3 (S37). Then if the pattern of the received transmission signal matches the predetermined pattern of the packet preamble (i.e., hit), the search system will change to state HIT (S34) again. Otherwise, if the pattern of the received transmission signal does not match the predetermined pattern of the packet preamble (i.e., miss) continually making the parameter hit_cnt less than or equal to the parameter miss_cnt, the search system will change back to state INIT (S32).

Figure 4:
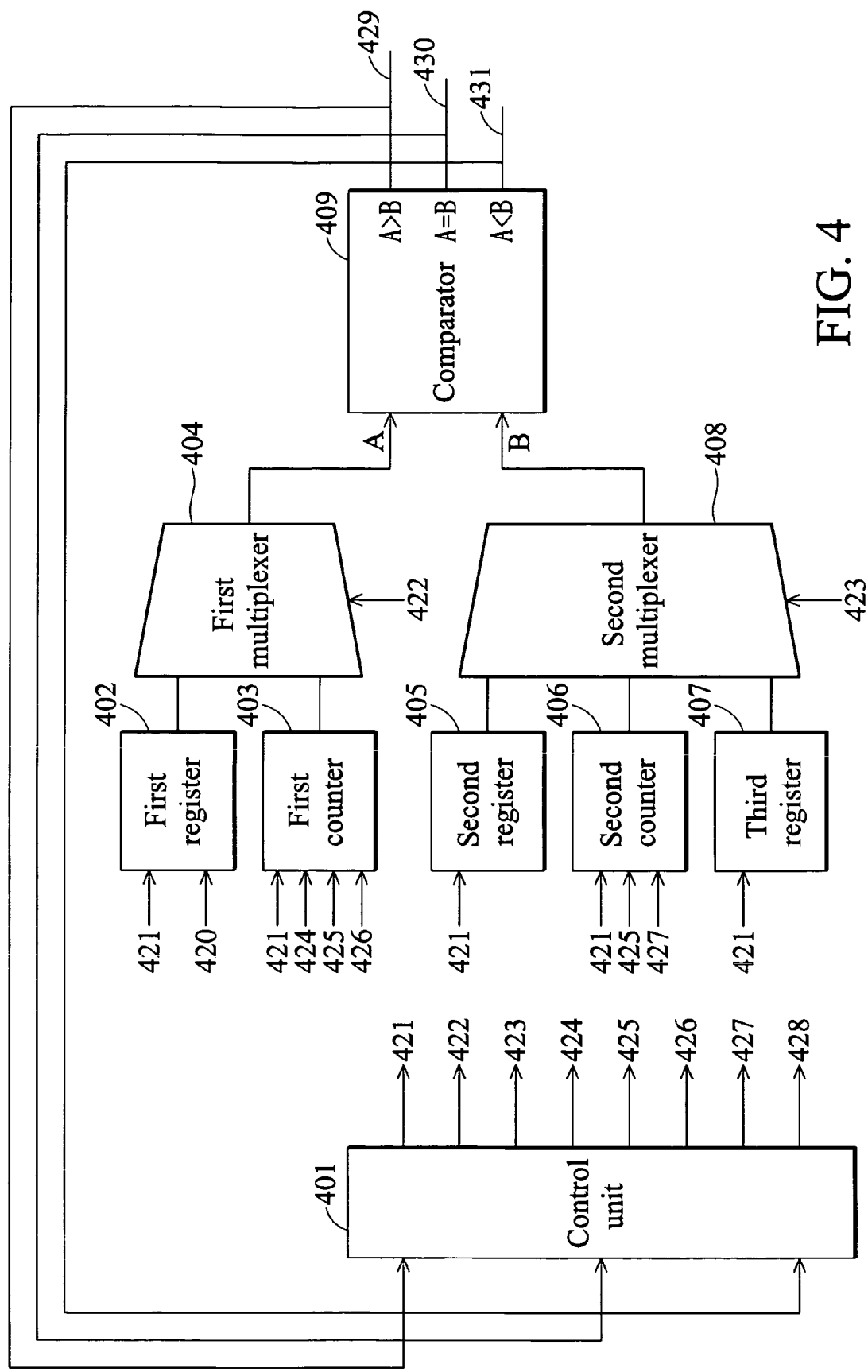
FIG. 4 illustrates a packet preamble search device in accordance with the embodiment of the present invention.

FIG. 4 illustrates a packet preamble search device in accordance with the embodiment of the present invention. The packet preamble search device comprises a first register 402, a second register 405, a third register 407, a first counter 403, a second counter 406, a comparator 409, and a control unit 401.

The first register 402 functions as storing the pattern of the received transmission signal. The second register 405 functions as storing the predetermined pattern. The third register stores a predetermined threshold value. The first counter 403 stores the hit count. The second counter 406 stores the miss count. The comparator 409 compares the pattern of the transmission signal with the predetermined pattern, compares the hit count with the predetermined threshold value, and compares the hit count with the miss count. The control unit 401 coordinates and controls the signal transmission and operation sequence of components of the packet preamble search device.

When the packet preamble search device is activated, the control unit 401 reads the pattern of the received transmission signal from the first register 402 by a read signal 421, and outputs the read pattern from a first multiplexer 404 as a signal A to the comparator 409 by a first select signal 422, and concurrently reads the predetermined pattern of the packet preamble from the second register 405 by the read signal 421, and outputs the read predetermined pattern from a second multiplexer 408 as a signal B to the comparator 409 by a second select signal 423. The comparator 409 compares the signal A from the first multiplexer 404 with the signal B from the second multiplexer 408, and outputs the comparison result to the control unit 401. When the pattern of the received transmission signal matches the predetermined pattern of the packet preamble, the comparator 409 generates a signal 430. The control unit 401 generates a hit signal 424 to increase the first counter 403 according to the signal 430 and generates a second reset signal 427 to reset the second counter 406. The control unit 401 then reads the hit count from the first counter 403 by the read signal 421, and outputs the read hit count from the first multiplexer 404 as the signal A to the comparator 409 by the first select signal 422, and concurrently reads the predetermined threshold value from the third register 407 by the read signal 421, and outputs the read predetermined pattern from the second multiplexer 408 as a signal B to the comparator 409 by the second select signal 423. The comparator 409 then compares the signal A from the first multiplexer 404 with the signal B from the second multiplexer 408, and output the comparison result to the control unit 401. When the hit count is greater than or equal to the predetermined threshold value ($A \geq B$), the comparator 409 generates signal 429 or 430. The control unit 401 accordingly generates an address check signal 428. When the hit count is less than the predetermined threshold value ($A<B$), the comparator 409 generates signal 431. The control unit 401 accordingly continues to compare the other patterns of the received transmission signal with the predetermined pattern of the packet preamble to determine whether they match. When the pattern of the received transmission signal does not match the predetermined pattern of the packet preamble ($A>B$ or $A<B$), the comparator 409 will generates signal 429 or 431. The control unit 401 accordingly decreases the first counter 403 and increase the second counter 406. Then the control unit 401 reads the hit count from the first counter 403 by the read signal 421, and outputs the read hit count from the first multiplexer 404 as the signal A to the comparator 409 by the select signal 422, and concurrently reads the miss count from the second counter 406 by the read signal 421, and outputs the read miss count from the second multiplexer 408 as a signal B to the comparator 409 by the select signal 423. The comparator 409 compares the signal A from the first multiplexer 404 with the signal B from the second multiplexer 408, and outputs the comparison result to the control unit 401. When the hit court is less than or equal to the miss count ($A \leq B$), the comparator 409 generates signal 431 or 430. The control unit 401 accordingly generates a first reset signal 426 to reset the first counter 403, and generates a second reset signal 427 to reset the second counter 406. When the hit count is greater than the miss count ($A>B$), the comparator 409 generates signal 429. The control unit 401 will accordingly continues to compare the other patterns of the received transmission signal with the predetermined pattern of the packet preamble to check whether they are matched or not.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A packet preamble search method in a communication system for locating a packet preamble with multiple predetermined patterns of a predetermined regular form of a packet wherein the predetermined pattern has a predetermined bit length, comprising:
   receiving a transmission signal with sequential multiple patterns, and each pattern having the predetermined bit length;
   sequentially comparing the pattern of the transmission signal with the predetermined pattern using a comparator, and increasing a hit count when the pattern of the transmission signal matches the predetermined pattern; and
   activating an address matching procedure when the hit count is greater than or equal to a predetermined threshold value,
   wherein sequential comparison of the pattern of the transmission signal with the predetermined pattern further comprises:
      resetting a miss count when the pattern of the transmission signal matches the predetermined pattern;
      increasing the miss count and decreasing the hit count when the pattern of the transmission signal does not match the predetermined pattern; and resetting the hit count and the miss count when the hit count is less than or equal to the miss count.

2. The packet preamble search method as claimed in claim 1, wherein the predetermined bit length is even.

3. A packet preamble search device in a communication system for locating a packet preamble of a packet within a received transmission signal with sequential multiple patterns, and each pattern having a predetermined bit length, wherein the packet preamble comprises multiple predetermined patterns of a predetermined regular form wherein the predetermined pattern having the predetermined bit length, the packet preamble search device comprising:

a first register for storing the pattern;
a second register for storing the predetermined pattern;
a third register for storing a predetermined threshold value;
a first counter for storing a hit count and increasing the hit count according to a hit signal;
a comparator for sequentially comparing the pattern of the transmission signal with the predetermined pattern, and comparing the hit count with the predetermined threshold value; and
a control unit, according to a comparison result of the comparator, providing the hit signal when the pattern of the transmission signal matches the predetermined pattern, and providing an address check signal when the hit count is greater than or equal to the predetermined threshold value,
wherein the first counter further decreases the hit count according to a miss signal, and the comparator further compares the hit count with a miss count and according to the results of the comparison resets the hit count according to a first reset signal.

4. The packet preamble search device as claimed in claim 3, wherein the control unit, according to a comparison result of the comparator, further provides a second reset signal when the pattern of the transmission signal matches the predetermined pattern, provides the miss signal when the pattern of the transmission signal does not match the predetermined pattern, and provides the first reset signal when the hit count is less than or equal to the miss count.

5. The packet preamble search device as claimed in claim 4 further comprising a second counter for storing the miss count and increasing the miss count according to the miss signal, and for resetting the miss count according to the second reset signal.

6. The packet preamble search device as claimed in claim 3, wherein the predetermined bit length is even.

* * * * *